W. T. EISENHART.
Bee Hive.
No. 59,569. Patented Nov. 13, 1866.
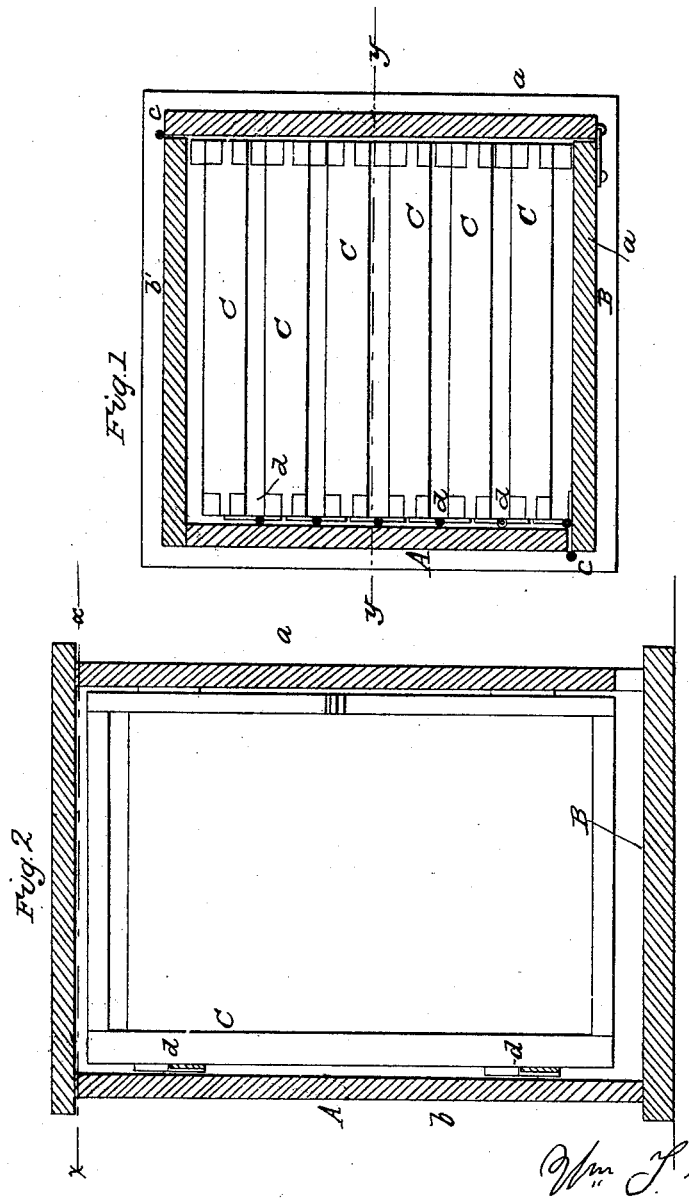
WITNESSES
Jas. A. Service
Wm. Dean Overill
INVENTOR
Wm. T. Eisenhart
Per Wmm &Co
Attorneys.

UNITED STATES PATENT OFFICE.

WILLIAM T. EISENHART, OF DOYLESTOWN, PENNSYLVANIA.

IMPROVEMENT IN BEE-HIVES.

Specification forming part of Letters Patent No. 59,569, dated November 13, 1866.

*To all whom it may concern:*

Be it known that I, WILLIAM T. EISENHART, of Doylestown, in the county of Bucks and State of Pennsylvania, have invented a new and Improved Bee-Hive; and I do hereby declare that the following is a full, clear, and exact description thereof, which will enable others skilled in the art to make and use the same, reference being had to the accompanying drawings, forming part of this specification, in which—

Figure 1 is a horizontal section of my invention, taken in the line $x\ x$, Fig. 2; Fig. 2, a vertical section of the same, taken in the line $y\ y$, Fig. 1.

Similar letters of reference indicate like parts.

This invention relates to a new and improved manner of hanging the comb-frames in the body of the hive, as hereinafter fully shown and described, whereby the frames are rendered perfectly accessible, so that any one frame may be removed from the hive without disturbing the others.

A represents the case of the hive, of quadrilateral form, and having two sides, $a\ a$, connected to the other two sides, $b\ b$, by hinges $c$, the sides $b\ b$ being firmly secured to the base B. By this arrangement the sides $a\ a$ may be swung open and the interior of the hive fully exposed.

C represents a series of comb-frames, which are connected together by hinges $d$, and the outermost frame C, at one side of the series, is connected by hinges $d'$ to one of the hinged sides $a$, as shown clearly in Fig. 1.

From the above description it will be seen that by opening the sides $a\ a$ all the comb-frames will be exposed, and the frames moved or adjusted so that the combs of each frame may be inspected, and any one of the frames detached without disturbing the others.

What I claim as new, and desire to secure by Letters Patent, is—

A bee-hive constructed with two fixed and two hinged sides, with the comb-frames connected together by hinges, and the outermost frame, at one side, attached by a hinge to one of the hinged sides of the case, substantially as and for the purpose herein set forth.

WILLIAM T. EISENHART.

Witnesses:
M. S. STEWART,
L. B. THOMPSON.